United States Patent [19]

Cook

[11] 4,153,393
[45] May 8, 1979

[54] DUAL PUMP OPERATION OF COIN-OPERATED WASHING SYSTEM

[75] Inventor: James E. Cook, Anoka, Minn.

[73] Assignee: Lear Siegler, Inc., Santa Monica, Calif.

[21] Appl. No.: 787,746

[22] Filed: Apr. 15, 1977

[51] Int. Cl.² .......................................... F04B 23/04
[52] U.S. Cl. .................................. 417/429; 417/533
[58] Field of Search ............... 417/286, 319, 426, 429, 417/533, 2, 3, 5, 7; 239/127

[56] References Cited

U.S. PATENT DOCUMENTS

| | | | |
|---|---|---|---|
| 2,638,847 | 5/1953 | McGowan | 417/429 |
| 2,853,211 | 9/1958 | Chase | 417/533 X |
| 2,968,915 | 1/1961 | Feistel | 417/429 X |
| 3,025,965 | 3/1962 | Bergman et al. | 417/429 X |
| 3,320,895 | 5/1967 | Peterson et al. | 417/319 |
| 3,831,849 | 8/1974 | Studinger | 239/127 |
| 3,951,570 | 4/1976 | DeBiaggi | 417/429 X |
| 3,970,413 | 7/1976 | Duveau | 417/7 |
| 3,997,114 | 12/1976 | Hewitt | 239/127 |
| 4,029,443 | 6/1977 | Burnside et al. | 418/48 |

FOREIGN PATENT DOCUMENTS

216985  1/1961  Austria .................................... 417/319

Primary Examiner—Carlton R. Croyle
Assistant Examiner—Edward Look
Attorney, Agent, or Firm—Orrin M. Haugen; Thomas J. Nikolai

[57] ABSTRACT

A high pressure liquid pumping system having means for selecting multiple output pressures and capacities and comprising a motor with a pair of pumps operatively coupled thereto. Each pump is coupled to the motor by a separate coupling means, with one pump being normally drivably coupled to the motor, and with the second pump being intermittently coupled to the motor.

A first selector switch means engages the motor, while a second selector switch means is utilized to energize a clutch to couple the second pump to the motor when higher output pressures and capacities are desired.

5 Claims, 1 Drawing Figure

DUAL PUMP OPERATION OF COIN-OPERATED WASHING SYSTEM

BACKGROUND OF THE INVENTION

The present invention relates generally to an improved pressure liquid pumping system, and more specifically to a high pressure liquid pumping system having multiple output pressures and capacities. The system includes a first fluid pump which is normally coupled to the drive motor, along with a second pump which is intermittently coupled to the motor, and is accordingly energized whenever higher output pressures and capacities are desired.

The high pressure liquid pumping system of the present invention is particularly adapted for utilization in the coin operated car wash field. In the period of time that such car wash systems have been utilized, the users have normally responded favorably to those installations having higher pressure or volumes available. While initial modest increases in both pressure and capacity are available from improved water availability and plumbing, these gains were sufficiently small so as to require improved equipment for the pressures and volumes required in today's car wash industry.

As it will be appreciated, increases in pressure and capacity or volume have reached levels which are required only by certain selected customers. Stated another way, the objective of the user will normally determine the pressures and volumes required to accommodate his purpose. Thus, the present system enables the user to select the pressure and volume desired, and upon exercising his selection, he may accomplish the objective with a system having the capabilities to achieve his requirements.

Significant savings in both energy and water volume may be obtained in accordance with the present system. Energy is saved by virtue of a reduction in the overall volume of hot water employed, and further by a reduction in the quantity of soap or detergent which may be utilized to accomplish his objective. Secondly, a reduction in the volume of water passed through the system will be reflected in a reduction in the overall water volume requirements for the system. Hence, a system of the present invention is adapted to match the capability of the equipment by both pressures and volume to the requirements of the user, and accordingly will not overindulge the system with excessive pressures and/or water volumes.

Essentially, the system of the present invention employs a pair of pumps which are normally positive displacement pumps, which operate from a single power source, normally an electric motor. One of the pumps is coupled normally to the motor, and accordingly will be driven at all times. The second pump is intermittently coupled to the motor, such as through an electric clutch or the like, and will be energized in response to a selector switch. Normally, the pumps are supplied by a common supply source, and the outputs from the pumps are coupled together through a single discharge line.

Since positive displacement pumps are being utilized, these pumps are each provided with a pumping chamber having inlet and outlet check valves operatively coupled into the system. In normal operation, therefore, the inlet check valve will resist outward flow from the pumping chamber, and the outlet check valve will resist flow inwardly to the pumping chamber. Thus, the second pump which is only intermittently energized and utilized will neither lose its prime during periods of operation of the first pump alone, nor will the second pump provide a bypass link in the system.

SUMMARY OF THE INVENTION

Therefore, it is a primary object of the present invention to provide an improved high pressure liquid pumping system having means for selecting multiple output pressures and capacities and/or volumes, with the system being driven by a single motor means, and having a pair of high pressure pumps operatively coupled thereto.

It is yet a further object of the present invention to provide an improved high pressure liquid pumping system which utilizes a pair of positive displacement pumps operatively coupled to a single motor, and wherein one of the two pumps is normally operatively coupled directly to the motor, and wherein the second pump is only intermittently coupled to the motor in response to actuation of a certain selector switch means.

It is yet a further object of the present invention to provide an improved high pressure liquid pumping system which employs a pair of positive displacement pumps operatively coupled to a single drive motor, and wherein the inlet and outlet check valves of the pumps eliminate the possibility of the intermittently driven pump from becoming a bypass to the output of the first pump.

Other and further objects of the present invention will become apparent to those skilled in the art upon a study of the following specification, appended claims, and accompanying drawing.

DESCRIPTION OF THE PREFERRED EMBODIMENT

Figure 1:
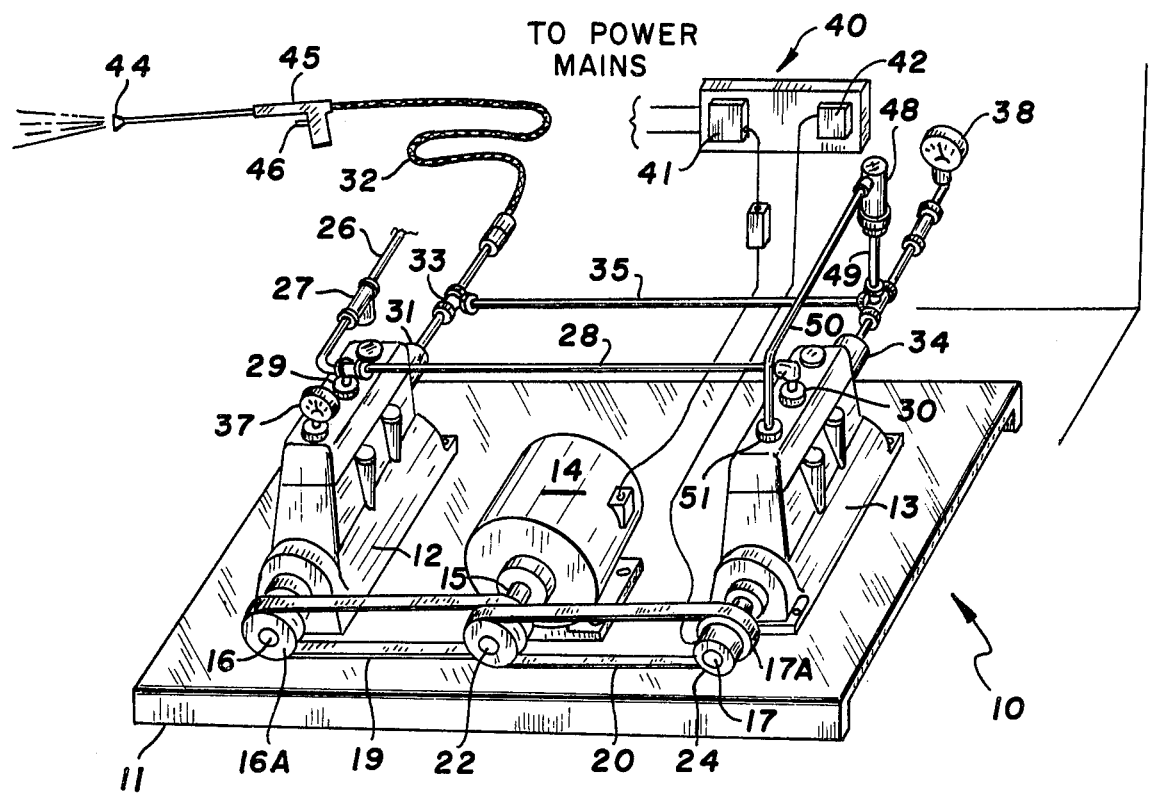
FIG. 1 is a perspective view of a high pressure liquid pumping system prepared in accordance with the present invention, and illustrating a single motor drivably coupled to two separate fluid pumps, and wherein the discharge from the pumps is coupled together so as to achieve multiple output pressures and volumes.

In accordance with the preferred embodiment of the present invention, and with particular attention being directed to the single figure of drawing, the system generally designated 10 includes a mounting base or platform 11 upon which is secured first and second liquid pumps 12 and 13, and a single drive motor 14. The motor 14 has an output shaft 15 and is, of course, normally driven at a certain predetermined rotational rate. The pump 12 is provided with an input drive shaft as at 16, and pump 13 is provided with an input drive shaft as at 17. Endless belt 18 operatively couples the output shaft 15 of motor 14 to input shaft 16 of pump 12, while endless belt 20 couples the motor output shaft 15 to the input shaft 17 of pump 13. As is apparent in the drawing, drive pulley 22, which is a double groove V-belt sheave pulley, is fastened on shaft 15. On the other hand, belt 20 only intermittently energizes shaft 17 of pump 13 through electric clutch assembly 24 energized by a selector switch as will be more fully explained hereinafter.

Pumps 12 and 13 are, as indicated, positive displacement pumps preferably of a multi-cylinder type. Two such pumps which may be advantageously utilized in the system of the present invention are those certain pumps disclosed and claimed in U.S. Pat. No. 3,666,382 and U.S. Pat. No. 3,747,478, although it will be understood that other multiple cylinder (or even single cylinder) positive displacement pumps may be suitably employed. A single supply line is provided for the two pumps, such as is illustrated at 26, with a strainer being provided as at 27 to remove any debris from the line which may tend to damage any of the components. Line 28 extends from pump 12 to pump 13, and provides a supply source for pump 13. The inlet to pump 12 is illustrated at 29, while the inlet to pump 13 is shown at 30.

The discharge lines are also secured together, with the discharge from pump 12 being illustrated at 31, and coupled to common discharge line 32 through "T" 33. The discharge from pump 13, as shown at 34, is brought to discharge line 32 through cross-line 35.

Suitable gages may be provided in order to evaluate the operational parameters of the system, such as the vacuum gage 37 which is coupled to the inlet manifold of pump 12, and pressure gage 38 which is coupled to the common discharge of the system.

In order to actuate the system, a switch panel is indicated generally as at 40, and includes a main switch 41 along with a second switch, such as selector switch 42. Energization of the contacts of switch 41, as indicated, will provide a flow of power from the power means to motor 14, while switch 42 couples the power to the electric clutch 24. For most applications, clutch 24 will be a 12 volt clutch, with such clutches being, of course, commercially available and widely utilized in coupling the output of drive motors to working implements. A suitable electric clutch which is both inexpensive and readily available is that type used on automotive air conditioner systems, with such clutches being capable of starting and stopping the low torque, low pulsation pumps are recommended for utilization in the present system.

In the discharge line 32, a discharge nozzle is shown as at 44, with nozzle 44 being controlled by hand operated handle member 45, with handle 45 normally having an on-off valve (not shown) included in the line, and actuated by button switch 46. These hand operated valves are widely utilized in car wash systems, and are, of course, commercially available. Inasmuch as the output from the system through the discharge line 32 will be intermittent, a relief valve must be provided in the system and such a valve is shown as at 48. Valve 48 is a balanced relief valve, and may typically be of the type disclosed and claimed in U.S. patent application Ser. No. 701,351, filed June 30, 1976, assigned to the same assignee as the present invention. Valve 48 permits a flow of fluid from cross-line 35 through line 49, thence through relief valve 48, line 50, and into pump 13 through alternate inlet 51. Fluid entering pump 13 through inlet 51 will then be transmitted back to pump 12 through the inlet manifold of pump 13, exiting through inlet 30 and passing in a reverse direction through line 28, and thence into pump 12 through normal inlet 29. Accordingly, relief valve 48, in this system, functions as an unloader valve and permits pump 12 to continue to run at all times. In the event both pumps are operational, the system will function essentially in the same fashion, with fluid circulating through pump 13 from outlet 34, through valve 48, and thence into alternate inlet 51. Of course, a portion of the fluid passing through valve 48 will then be passed back through pump 12 in the manner previously described.

In a typical operating system, and utilizing two pumps rated at, for example, 1,000 PSI and four gallons per minute, will normally be equipped with a three horse power, three phase 220/440V electric motor. The pulleys will include a single pulley 16A for motor 12, which will normally be a three inch single groove pulley driven by the three inch double groove V-belt sheave pulley 22. The drive pulley for pump 13 will preferably be a six inch single groove pulley, such as is shown at 17A.

The system will incorporate nozzle 44, which preferably is a 11×25° nozzle for maintaining proper operational pressures in the system described. The pumps are each rated at 1,000 PSI and four gallons per minute, however, a #11 nozzle will provide four gallons per minute at 500 PSI. This is sufficient pressure and volume for most normal duty car wash applications, with this pressure and volume providing a manageable pressure/volume combination. A customer or user requiring heavier duty equipment, such as due to heavy soil encountered on over-the-road vehicles or special applications will require greater pressure and volume. This user will then actuate selector switch 42 so as to energize clutch 24, then causing pump 13 to operate at half-speed. At half-speed, pump 13 will contribute an additional two gallons to the four gallon flow from pump 12, and increase the pressure from 500 PSI to 1,000 PSI. The user then has a system operating at 1,000 PSI and delivering a volume of six gallons per minute to perform his unusual clean operation.

I claim:

1. In a high pressure liquid pumping system having means for selecting multiple output pressures and capacities and comprising:

(a) motor means having an output shaft delivering energy at a certain predetermined rotational rate;
    (b) first and second fluid pumps, each having an input drive shaft and with the fluid inlet of each being coupled to a common source of liquid, conduit means coupling the inlet of said first fluid pump to the inlet of said second fluid pump, and with the outlet of each fluid pump being coupled together to a common discharge line, and with said discharge line having means for providing an intermittent output from said pumping system;
    (c) first and second drive means coupling said motor means to said input drive shafts of said first and second fluid pumps respectively, with said first drive means being normally drivably coupled to said drive shaft of said first fluid pump, and with said second drive means being normally disengaged from driving said drive shaft of said second fluid pump and having an electrical selector switch means for selectively and electromechanically coupling said second drive means to said drive shaft of said second fluid pump, and
    (d) bypass means including a bypass conduit having an automatic, pressure-operated unloader valve interposed therealong coupling the output of said second fluid pump to the inlet thereof, with the fluid flow through said bypass conduit being controlled by said automatic, pressure-operated unloader valve.

2. The pumping system as defined in claim 1 being particularly characterized in that said second fluid pump is driven at a rate which is significantly different from that of said first fluid pump.

3. The pumping system as defined in claim 2 being particularly characterized in that said second fluid pump is driven at a speed substantially one-half that of said first fluid pump.

4. The pumping system as defined in claim 1 being particularly characterized in that said motor means is an electric motor, and with main switch contacts coupling a source of power to said motor means, and wherein said selector switch means energizes a clutch to couple the rotation of said motor means output shaft to the input drive of said second fluid pump.

5. The pumping system as defined in claim 1 being particularly characterized in that said first and second fluid pumps are positive displacement pumps and with each having a pumping chamber and with inlet check valves and outlet check valves operatively coupled to each of said pumping chambers, and with each of said inlet valves responsive to resist flow outwardly from one of said pumping chambers, and with each of said outlet check valves being responsive to resist flow inwardly to one of said pumping chambers.

* * * * *